(12) United States Patent
Bartosik

(10) Patent No.: US 6,910,005 B2
(45) Date of Patent: Jun. 21, 2005

(54) RECORDING APPARATUS INCLUDING QUALITY TEST AND FEEDBACK FEATURES FOR RECORDING SPEECH INFORMATION TO A SUBSEQUENT OFF-LINE SPEECH RECOGNITION

(75) Inventor: Heinrich Franz Bartosik, Vienna (AT)

(73) Assignee: Koninklijke Philips Electronics N.V., Eindhoven (NL)

( * ) Notice: Subject to any disclaimer, the term of this patent is extended or adjusted under 35 U.S.C. 154(b) by 582 days.

(21) Appl. No.: 09/891,670

(22) Filed: Jun. 26, 2001

(65) Prior Publication Data
US 2002/0019734 A1 Feb. 14, 2002

(30) Foreign Application Priority Data
Jun. 29, 2000 (EP) .......................... 00890205

(51) Int. Cl.⁷ .................................. G10L 19/00
(52) U.S. Cl. ................. 704/201; 704/501; 704/246; 704/233; 704/270
(58) Field of Search ................. 704/201, 270, 704/246, 233, 501, 235; 178/18.03

(56) References Cited

U.S. PATENT DOCUMENTS

| | | | | |
|---|---|---|---|---|
| 5,243,149 A | * | 9/1993 | Comerford et al. | 178/18.03 |
| 5,809,464 A | * | 9/1998 | Kopp et al. | 704/235 |
| 5,835,667 A | * | 11/1998 | Wactlar et al. | 704/501 |
| 6,477,493 B1 | * | 11/2002 | Brooks et al. | 704/246 |
| 6,662,156 B2 | * | 12/2003 | Bartosik | 704/233 |

FOREIGN PATENT DOCUMENTS

| | | | |
|---|---|---|---|
| EP | 0851403 A2 | 1/1998 | ............ G10L/3/00 |
| EP | 2323693 | 9/1998 | ............ G10L/3/00 |
| GB | 2 082 820 A | * 3/1982 | ............ G06F/3/16 |
| GB | 2323693 A | 9/1998 | ............ G10L/3/00 |
| GB | 2346001 A | 7/2000 | ............ G10L/15/20 |
| GB | 2 346 001 A | * 7/2000 | ............ G10L/15/22 |

* cited by examiner

Primary Examiner—Vijay B. Chawan

(57) ABSTRACT

A recording apparatus includes quality test and feedback features for recording speech information of a dictation and subsequently transfers the recorded speech information to a speech recognition device for off-line speech recognition. A recorder records speech information in a recording mode. A transfer unit transfers recorded speech information to the speech recognition device in a transfer mode. The speech recognition device recognizes text information to be assigned to the transferred speech information, the quality of recognized text information depending on the quality of the received speech information. A speech quality tester tests whether the quality of the speech information received in the recording mode is sufficient for obtaining a predefined quality of the recognized text information when the speech information is processed by the speech recognition device. A feedback unit transfers feedback information in the recording mode, the feedback information representing the result of the speech quality test.

4 Claims, 1 Drawing Sheet

Figure 1:
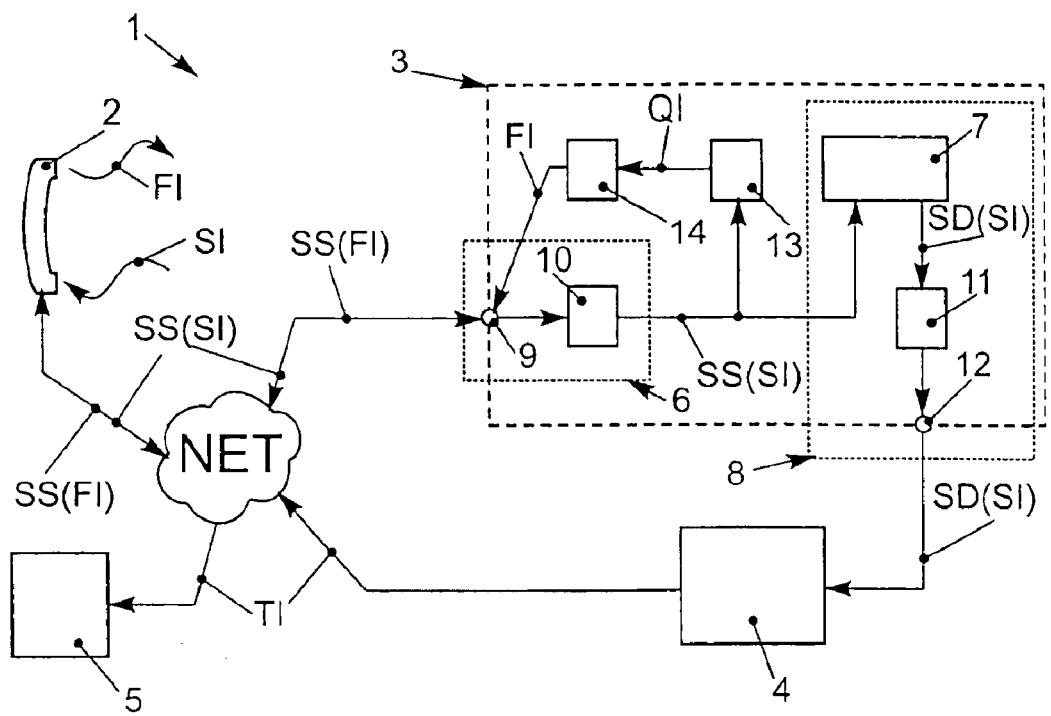

RECORDING APPARATUS INCLUDING QUALITY TEST AND FEEDBACK FEATURES FOR RECORDING SPEECH INFORMATION TO A SUBSEQUENT OFF-LINE SPEECH RECOGNITION

The invention relates to a recording apparatus for recording speech information of a dictation and for the subsequent transfer of the recorded speech information of the dictation to a speech recognition device for off-line speech recognition, the apparatus comprising receiving means for receiving the speech information of the dictation, recording means for recording the received speech information of the dictation in a recording mode of the recording apparatus and transfer means for transferring recorded speech information of the dictation to the speech recognition device in a transfer mode of the recording apparatus, which speech recognition device is arranged for recognizing text information to be assigned to the transferred speech information, the quality of the recognized text information depending on the quality of the received speech information.

Such a recording apparatus of the type defined in the opening paragraph is known from GB-A-2,323,693 and formed by a computer server of an off-line speech recognition service. For using the off-line speech recognition service, a user can call the computer server via a telephone and speak a dictation into the telephone. Receiving means of the computer server are connected to the telephone line and recording means formed by a hard disk store the received speech signal.

After the user has ended the dictation, the recorded speech signal is transferred to a speech recognition device for off-line speech recognition. The speech recognition device recognizes the text information to be assigned to the speech signal, after which an operator of the off-line speech recognition service corrects the obvious mistakes in the recognized text information. Subsequently, the recognized and corrected text information is sent by e-mail to the user of the off-line speech recognition service and the cost of the effort made is debited to the user.

In the known recording device it has proved to be disadvantageous that the user of the off-line speech recognition service in some cases makes a long dictation and does not receive any feedback whether the quality of the received and recorded speech signal is sufficiently good for the speech recognition device to successfully process the subsequently transferred speech signal. When it happens to a user of the off-line speech recognition service that the recorded speech signal of his dictation—for example, due to a poor telephone line—cannot be evaluated by the speech recognition device, this user will no longer use the off-line speech recognition service, which means a large financial loss for the provider of the off-line speech recognition service.

A further disadvantage of the known recording device proves to be that with a poor quality of the recognized text information the operator of the off-line speech recognition service is to correct many obvious mistakes. Thus the cost of the off-line speech recognition service can be reduced substantially, when the user of the off-line speech recognition service is pointed at the poor quality of the received speech information already during the dictation.

It is an object of the invention to provide a recording device for which the user of an off-line speech recognition service already during the dictation receives feedback whether the quality of the received speech signal, in the case of off-line speech recognition, is sufficient for recognizing text information with a sufficiently high quality with the speech recognition device following in the circuit.

This object is achieved with a recording device of the type defined in the opening paragraph in that speech quality test means are provided, which are arranged for testing whether the quality of the speech information received in the recording mode is sufficient for obtaining a predefined quality of the recognized text information when the speech information is processed by the speech recognition device, which speech information is transferred by the transfer means in the transfer mode, and in that feedback means are provided which are arranged for transferring feedback information in a recording mode of the recording device, which feedback information represents the result of the test of the speech quality test means.

This offers the advantage that the user of the recording device already during the dictation receives feedback whether the quality of the received speech information will be sufficient for a successful processing by the speech recognition device.

It may be observed that a dictating machine is known which includes indicators by which the user recognizes the recording level of the recorded speech signal. The user can then speak more loudly or in a lower voice to obtain a better recording level of the recorded speech signal. However, this monitoring of only one or a plurality of parameters of the received speech signal is not sufficient to reliably achieve the object defined above.

Furthermore, it may be observed that a speech recognition device for executing an on-line speech recognition method is known in which a user can make a dictation into a microphone and gets the recognized text displayed on the monitor after a brief processing period. If the user recognizes that the quality of the recognized text is poor seen from many mistakes in the recognized text, the user can utilize the representation of the recording level of the processed speech signal to accordingly change his loudness during the dictation, or adapt the audio behavior of the microphone of the speech recognition device once again.

In the known dictating machine and the known speech recognition device for on-line speech recognition, only one parameter of the received and processed speech signal is shown, which in no way corresponds to a test of the quality of the received speech information whether this is suitable for a subsequent speech recognition. Furthermore, with the known dictating machine and the known speech recognition device, further to the pure showing of the recording level of the processed speech signal, there is no indication from which value of the recording level onwards the quality of the received speech information is not good enough for a subsequent off-line speech recognition, which is not necessary anyway either for a pure recording of a dictation for later audio reproduction or for on-line speech recognition. Thus, neither the problem setting for the recording device according to the invention, nor the invented solution to this problem was known with the prior-art dictating machine and speech recognition device for on-line speech recognition.

According to the measures as claimed in claim 1 and claim 1, the advantage is obtained that already during the recording the quality of the speech signal to be recorded by the recording device is tested with respect to a sufficiently good signal-to-noise ratio and a sufficiently good level.

According to the measures as claimed in claim 1 the advantage is obtained that tests are made how fast the user speaks the words of the dictation and that, in case of too high a speech velocity, the user is requested via feedback information to speak more slowly to attain an accordingly high quality of the recognized text information.

According to the measures as claimed in claim 1 the advantage is obtained that tests are made how clearly or understandably, respectively, the user speaks the words of the dictation and that the user, if he pronounces the words indistinctly, is requested by feedback information to speak more clearly or understandably so as to obtain an accordingly high quality of the recognized text information.

According to the measures as claimed in claim 2 the advantage is obtained that during the dictation a recording device gives the user an indication based on the low quality of the received speech information so as to obtain by subsequent measures a sufficiently high-quality recording of the speech information for a subsequent speech recognition.

These and other aspects of the invention are apparent from and will be elucidated with reference to the embodiments described hereinafter.

Figure 2:
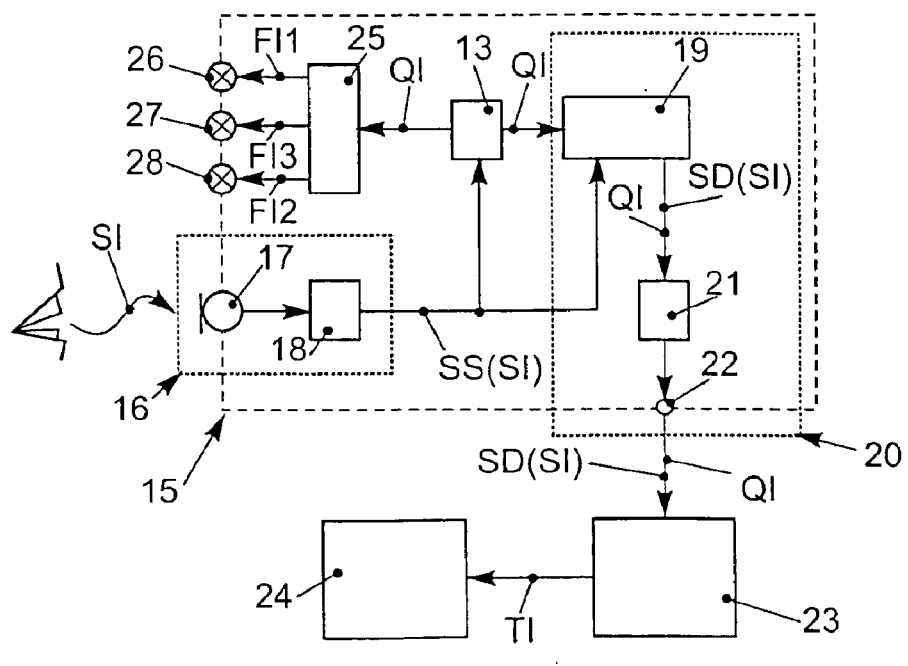

In the drawings:

FIG. 1 shows a telephone answering machine as a recording device by which recorded speech information can be applied to a speech recognition device, FIG. 2 shows a portable dictating machine which can be connected to a speech recognition device and includes speech quality test means and three light-emitting diodes which, if necessary, give an indication based on the low quality of the received speech information.

FIG. 1 shows an off-line speech recognition system 1 for implementing an off-line speech recognition method, which system includes a telephone 2, a telephone answering machine 3, a speech recognition computer 4 and a user terminal 5. The telephone 2 and the user terminal 5 are available to the user of the off-line speech recognition system 1 and are connected to the telephone answering machine 3 and the speech recognition computer 4 via a telephone/data network NET.

The speech recognition computer 4 works on speech recognition software—such as, for example, the speech recognition software SPEECHMAGIC™ by Philips—and thus forms a speech recognition device for an off-line speech recognition method. The speech recognition device is provided for receiving digital speech data SD(SI) of transferred speech information SI and for recognizing text information TI to be assigned to the received speech information SI, as this has been known for a long time.

The quality of the recognized text information TI can be described by a recognition quality value which can be determined as a ratio of the correctly recognized words in the recognized text information TI to all the words contained in the recognized text information TI. The quality of the text information TI recognized by the speech recognition device depends on many influence factors. Such influence factors are, for example, the training condition of the speech recognition device and the number of words that can be recognized by the speech recognition device and are contained in a basic lexicon. One of these influence factors, however, is also the quality of the speech information SI received by the speech recognition device, because even the best speech recognition device cannot recognize text information TI with a good recognition quality level when there is qualitatively poor speech information SI.

The quality of the speech information SI can be detrimentally affected already during the dictation by too strong background noise or by a bad microphone of the telephone 2, or, only after the transmission of the speech information SI, by poor transmission properties of the telephone line of the telephone/data network NET. The quality of an analog electric speech signal SS(SI) contained in the speech information SI can be described here by the signal-to-noise ratio of the speech signal SS(SI) and by the level of the speech signal SS(SI).

When the speech information SI contained in the speech signal SS(SI) is to be evaluated by the speech recognition device to recognize the text information TI, the quality of the speech information SI for the off-line speech recognition method can also be described by further parameters. One of these parameters is a speech velocity parameter which denotes the speed of the sequence of the words contained in the speech information SI, which will be further discussed hereinafter.

Both the speech recognition computer 4 and the user terminal 5 work on e-mail software—such as, for example, LOTUS NOTES® by IBM—and are connected to the telephone/data network NET. The speech recognition computer 4 sends as a termination of the off-line speech recognition method the recognized text information TI as an attachment to an e-mail to the user terminal 5 of the user of the off-line speech recognition system 1.

The telephone answering machine 3 forms a recording device for recording the speech information SI of a dictation transferred to the telephone answering machine 3 and for subsequently transferring the recorded speech information SI of the dictation. For this purpose, the telephone answering machine 3 includes receiving means 6, recording means 7 and transfer means 8.

The receiving means 6 include a telephone plug 9 and a telephone interface stage 10. The telephone answering machine 3 is connected to the telephone/data network NET via the telephone plug 9. The user of the off-line speech recognition system I can dial the telephone number of the telephone answering machine 3 with his telephone 2 and enter the speech information SI of his dictation, which he would like to receive as recognized text information TI with his user terminal 5. The telephone interface stage 10 is then provided for receiving and transferring the signals and voltages that correspond to the telephone standard, as this has been known for a long time. The speech signal SS(SI) of the speech information SI is thus transferred by the telephone 2 via the telephone/data network NET, the telephone plug 9 and the telephone interface stage 10 to the recording means 7.

The recording means 7 include an analog-to-digital converter for convert in the analog speech signal SS(SI) of the speech information SI into digital speech data SD(SI). The recording means 7 further include a hard disk on which the speech data SD(SI) are recorded in a recording mode of the telephone answering machine 3.

The recording means 7 form part of the transfer means 8 and in a transfer mode of the telephone answering machine 3 are arranged for reproducing or transferring, respectively, the recorded speech data SD(SI). The transfer means 8 of the telephone answering machine 3 further include a data processing stage 11 by which the reproduced speech data SD(SI) are coded in accordance with a coding method, which operation makes the further processing of the speech data SD(SI) easier for the speech recognition computer 4. Via a data terminal 12 of the transfer means 8, the processed speech data SD(SI) are transferred to the speech recognition computer 4 by the telephone answering machine 3.

The telephone answering machine 3 includes speech quality test means 13 which are arranged for testing whether the quality of the speech information SI received in the recording mode is sufficient to reach a predefined quality of the recognized text information TI during a processing of the speech information SI transferred by the transfer means 8 in the transfer mode. For this purpose, the speech quality test means 13 are arranged for testing the signal-to-noise ratio of the speech signal SS(SI), the level of the speech signal SS(SI) and the speech velocity parameter of the speech information SI.

For testing the signal-to-noise ratio, the energy contents of the spectral portions of time slots of the speech signal SS(SI) of 50 ms each are determined and a frequency distribution of the determined energy contents is made. The wider the curve of the frequency distribution determined in this manner, the smaller the signal-to-noise ratio of the speech signal SS(SI) is. The expert is familiar with further comparable methods of determining the signal-to-noise ratio of an electric signal.

In case of a too small signal-to-noise ratio, relatively large noise portions are contained in the speech signal SS(SI) and lead to a disturbance during the analog-to-digital conversion of the speech signal SS(SI), as a result of which the speech information SI contained in the speech data SD(SI) no longer corresponds to the speech information SI spoken by the user. The speech information SI occurring in such a qualitatively poor speech signal SS(SI) with a too small signal-to-noise ratio can be recognized by the speech recognition device with only a relatively low value of the recognition quality.

For testing the level of the speech signal SS(SI), the determined energy contents of the spectral portions are added together, while spikes of the energy contents are discarded. If the level of the speech signal SS(SI) is too low, the effect of noise signals superimposed on the speech signal SS(SI) is considerably more evident than if the speech signal SS(SI) has a sufficiently high level. Therefore, a too low level of the speech signal SS(SI) features a poor quality of the speech signal SS(SI).

For testing the speech velocity, the speech quality test means 13 determine the speech velocity parameter of the speech information SI. For this purpose, time measuring means provided in the speech quality test means 13 determine the distances in time of adjacent sections of the speech signal SS(SI) which have a large energy content. The smaller the time distances determined in this fashion, the faster the vocals in the speech information SI follow each other and the more rapidly the user of the off-line speech recognition system 1 has spoken.

There is a poor quality of the speech information SI for the processing according to the off-line speech recognition method if the speech velocity parameter found features that the user has spoken relatively fast. Such speech information SI can only poorly be recognized by the speech recognition device, as a result of which the text information TI recognized by the speech recognition device in this case has a poor quality and only a low value of the recognition quality.

The testing of the speech signal SS(SI) by the speech quality test means 13 takes place in a period of time of 10 seconds, after which the result of the quality test of the received speech information SI is transferred as speech quality information QI to feedback means 14 of the telephone answering machine 3. The testing of the speech signal SS(SI) during the 10-second-long period achieves that an only briefly poor quality of the speech signal SS(SI), for example as a result of a crack in the telephone line, does not lead to a low value of the speech quality information QI.

The feedback means 14 deliver feedback information FI to the user of the off-line speech recognition system 1 when the recording mode in the telephone answering machine 3 is activated and a low value of the speech quality information QI is received. The feedback information FI then features the result of the test of the speech quality test means 13.

This offers the advantage that the user of the off-line speech recognition system 1 already during the dictation receives feedback information FI if the quality of the speech information SI received in the telephone answering machine 3 is too low to realize text information TI that has a sufficiently high quality with the subsequent off-line speech recognition method. Therefore, the user can advantageously immediately react to the feedback information FI and thus avoid that his whole dictation cannot be used owing to the fact that the quality of the speech information SI is too low.

The operation of the off-line speech recognition system 1 and the advantages of the telephone answering machine 3 will be further explained in the following with reference to an example of embodiment. It is assumed that the user of the off-line speech recognition system 1 is a physician, who would like to dictate his findings. It is further assumed that the physician has already worked through an identification routine of the off-line speech recognition system 1 and that—in a manner not further shown in FIG. 1—the telephone number of the physician's telephone 2 together with the physician's credit card number has been stored in the off-line speech recognition system 1 for settling the off-line speech recognition service charges.

The physician now dials the telephone number of the telephone answering machine 3 and listens to the text which briefly explains the use of the off-line speech recognition system 1. The telephone interface means 10 identify the caller via the telephone number of the telephone 2 transmitted in the telephone protocol, so that the settlement of the off-line speech recognition service charges is made possible. Subsequently, the recording mode of the telephone answering machine 3 is activated and the physician starts to utter or dictate, respectively, his findings. Then the speech information SI of the spoken words is received as a speech signal SS(SI) by the receiving means 6 and stored as speech data SD(SI) on the hard disk of the recording means 7.

While the physician is dictating, his assistant enters the room and opens the window, after which the noise from the street is included as a relatively strong background noise in the speech information SI received by the telephone answering machine. The physician concentrated on his dictation does not notice this and carries on dictating his findings.

The speech quality test means 13 then ascertain, as a result of the continuously performed test of the signal-to-noise ratio, of the level and of the speech velocity, that the signal-to-noise ratio of the speech signal SS(SI) has dropped considerably, and send respective speech quality information QI to the feedback means 14. The feedback means 14 then reproduce a text recorded in the feedback means 14 as feedback information FI by which the user is pointed at too much background noise in his room. The speech signal SS(FI) corresponding to the reproduced text is applied to the telephone 2 via the telephone plug 9 and the telephone/data network NET. Via the feedback text FI the user is furthermore requested to reduce the background noise, because otherwise the recognized text information TI will contain many mistakes.

This offers the advantage that the physician is immediately pointed at the problem of too much background noise and that many mistakes in the recognized text information TI of the dictated text from the time when the window was opened onwards can be avoided. Alerted by the feedback text FI, the physician closes the window and carries on dictating, so that the problem with too much background noise is solved.

After the physician has stopped dictating his text, he stops the telephone call, after which the telephone answering machine changes from the recording mode to the transfer mode and transfers the recorded speech data SD(SI) of the physician's dictation to the speech recognition computer 4. If another user of the off-line speech recognition system 1 calls the telephone answering machine 3 while the speech data SD(SI) are being transferred, the transfer mode is interrupted and continued at a later time.

The speech recognition device formed by the speech recognition computer 4 then recognizes the text information TI to be assigned to the transferred speech data SD(SI) and transfers it as an attachment to an e-mail to the physician's user terminal 5. The physician thus receives the text recognized from his dictation per e-mail and the cost of this off-line speech recognition service is debited to his credit card account.

According to a further example of embodiment of the off-line speech recognition system 1, the physician dials the telephone number of the telephone answering machine 3 while in this case the transmission quality of the telephone line of the telephone/data network NET is relatively poor. This is ascertained by the speech quality test means 14 already during the test of the speech signal SS(SI) of the first words of the dictation of the physician by a low signal-to-noise ratio and a low level of the speech signal SS(SI).

Advantageously, already after the first words of the dictation, the physician receives feedback information FI from the feedback means 14 through which information he is requested to end the telephone call and call again, because the quality of the telephone line is very poor. In this way it is once again avoided that the physician dictates the whole text into the telephone 2 and is dissatisfied with the off-line speech recognition system 1 due to the poor quality of the recognized text.

The prompt feedback information FI of the recording device may advantageously additionally provide that it is avoided that a user of the off-line speech recognition system 1 who checks the text recognized by the speech recognition computer 4 for obvious mistakes before this text is sent per e-mail to the user terminal 5, has to correct a great many mistakes. Therefore, as a result of the immediate feedback to the user, additional working time of the employee can be saved, so that the off-line speech recognition service can be executed in a more cost-effective way.

FIG. 2 shows a handheld digital dictating machine 15 of the user, which also forms a recording device for off-line speech recognition. The speech information SI of the dictation spoken by the user is received by receiving means 16 which include a microphone 17 and a signal processing stage 18.

In a recording mode of the dictating machine 15 the speech signal SS(SI) of the speech information SI transferred by the signal processing stage 18 can be stored by recording means 19 which include an analog-to-digital converter and a flash RAM with a support battery as a storage medium.

The recording means 19 form part of transfer means 20 and in a transfer mode of the dictating machine 15 transfer the digital speech data SD(SI) containing the recorded speech information SI to a data processing stage 21 of the transfer means 20. The data processing stage 21 is arranged for processing the reproduced speech data SD(SI) and for transferring the processed speech data SD(SI) to a data terminal 22.

The dictating machine 15 can be connected by its data terminal 22 to a speech recognition computer 23, which runs speech recognition software. The text information TI recognized by the speech recognition computer 23 from the speech information SI transferred by the dictating machine 15 is transferred by the speech recognition computer 4 to a monitor 24 and displayed thereby.

The dictating machine 15 further includes speech quality test means 13, whose way of operation corresponds to the way of operation of the speech quality test means 13 shown in FIG. 1. The speech quality information QI ascertained by the speech quality test means 13 can be transferred to feedback means 25 and the recording means 19.

The feedback means 25 transfer a switch-on voltage as first feedback information FI1 to a light-emitting diode 26 when the speech quality test means 13 have ascertained a too small signal-to-noise ratio of the speech signal SS(SI). The feedback means 25 further transfer the switch-on voltage as second feedback information FI2 to a light-emitting diode 27 when the speech quality test means 13 have ascertained that the level of the speech signal SS(SI) is too low. The feedback means 25 further transfer the switch-on voltage as third feedback information FI3 to a light-emitting diode 28 when the speech quality test means 13 have ascertained, on the basis of the speech signal SS(SI), that the user has spoken too rapidly.

The way of operation of the dictating machine 15 will be further explained in the following with reference to an example of embodiment. According to the example of embodiment it is assumed that the user of the dictating machine 15 is traveling and would like to make a dictation with the dictating machine 15 to have the recorded dictation processed by his speech recognition computer 23 upon arrival and to have the monitor 24 display the recognized text information TI.

To this end the user activates the recording mode of the dictating machine 15 and begins recording the dictation. Since the user is in a great hurry, he dictates very fast, so that the speech velocity of the speech information SI recorded by the dictating machine 15 at this instant is too high to achieve a sufficiently high recognition quality of the recognized text information TI with the off-line speech recognition method and the speech recognition computer 23.

Speech quality test means 13 then transfer respective speech quality information QI to the feedback means 25 which, on their part, transfer the third feedback information FI3 to the light-emitting diode 28. Consequently, the light-emitting diode 28 starts emitting light and indicates to the user that he is speaking too fast and that the recorded speech data SD(SI) are unsuitable for off-line speech recognition.

Advantageously, the user, by noticing the flashing of the light-emitting diode 28, recognizes that he speaks the words of the dictation too fast and then starts speaking more slowly. So doing, the light-emitting diode 28 extinguishes and the speech data SD(SI) recorded from this instant onwards are suitable for the subsequent successful processing by the speech recognition computer 23.

The recording means 19 record the speech quality information QI assigned to the respective speech data SD(SI) and determined by the speech quality test means 13 and transfer it together with the speech data SD(SI) to the speech recognition computer 23 in the transfer mode of the dictating machine 15.

This offers the advantage that the speech recognition computer 23, while processing speech data SD(SI) that include speech information SI of a very poor quality, may be arranged for taking suitable measures to process these speech data SD(SI) with as good a result of the recognition quality as possible. Such measures may consist, for example, of a suitable pre-processing of the received digital speech data SD(SI).

It may be observed that an off-line speech recognition method in this respect is understood to be a speech recognition method in which the user is not immediately shown the recognized text information TI assigned to the speech information SI during the dictation, as this is the case with on-line speech recognition methods. Such an on-line speech recognition method is realized, for example, with the speech recognition software FREESPEECH 2000™ by Philips.

It may be observed that as a result of the recording and transferring of speech information SI by the recording means, there is no additional degradation of the quality of the received speech information SI, because the speech information SI is recorded as digital speech data SD(SI). As a result, actually—as described above—by testing the quality of the received analog speech signal SS(SI) by the speech quality test means, the quality of the digital speech data SD(SI) in the end received and processed by the speech recognition device may be inferred.

It may be observed that the quality of the speech information SI for the off-line speech recognition method can also be described by a further parameter, that is, an understandability parameter. By a statistic analysis of the succession in time of frequency portions of the speech signal SS(SI) by the speech quality test means, there may be ascertained whether the speech signal SS(SI) contains speech information SI or only noise or music. The understandability parameter may also be determined by means of an alternative analysis of the speech signal SS(SI) in which different parameter magnitudes (average energy, spectrum, zero-crossings, pitch . . . ) of the speech signal SS(SI) are coupled for a classification of the speech signal SS(SI).

When a threshold value for the ascertained understandability parameter for distinguishing whether or not speech information SI is contained in the speech signal SS(SI) is determined to be relatively high, also speech information SI pronounced by the user in an indistinct or hardly understandable manner is classified as noise. In this way a recording device according to the invention is enabled to transfer feedback information FI to the user, which information points the user at his indistinct articulation during the pronunciation of the dictation. Subsequently, the user will start speaking more clearly so that, advantageously, the quality of the recognized text information TI will improve.

What is claimed is:

1. A recording apparatus for recording speech information of a dictation and for subsequent transfer of the recorded speech information to a speech recognition device for off-line speech recognition, said apparatus comprising:

receiving means for receiving the speech information of the dictation;

recording means for recording the received speech information of the dictation during a recording mode of the recording apparatus;

transfer means for transferring recorded speech information of the dictation to the speech recognition device during a transfer mode of the recording apparatus, which speech recognition device is arranged for off-line speech recognition and for recognizing text information to be assigned to the transferred speech information, the quality of the recognized text information depending on the quality of the received speech information;

speech quality test means for testing whether a quality of the speech information received during the recording mode is sufficient for obtaining a predefined quality of the recognized text information in response to the speech recognition device processing the speech information transferred by the transfer means in the transfer mode, wherein the speech quality test means continuously tests (i) a signal-to-noise ratio of the received speech signal, (ii) a level of the received speech signal, and (iii) a velocity of speech in the received speech signal during the recording mode, and wherein the speech quality test means outputs a quality information signal during the recording mode as a function of testing the corresponding signal-to-noise ratio of the received speech signal, the level of the received speech signal, and the velocity of speech in the received speech signal; and feedback means responsive to the quality information signal during the recording mode for transferring feedback information immediately during the recording mode, wherein the feedback information represents at least one of an immediate corrective measure and an immediate result of the corresponding quality test of the speech quality test means.

2. The recording device as claimed in claim 1, wherein the feedback means transfers feedback information that provides an immediate indication how the quality of the received speech information can be improved by measures of the user.

3. The recording device as claimed in claim 1, wherein the receiving means is connected for receiving the speech information via one of a telephone line and a data line.

4. A recording apparatus for recording speech information of a dictation and for subsequent transfer of the recorded speech information to a speech recognition device for off-line speech recognition, said apparatus comprising:

means for receiving the speech information of the dictation;

means for recording the received speech information of the dictation during a recording mode of the recording apparatus;

means for transferring recorded speech information of the dictation to the speech recognition device during a transfer mode of the recording apparatus, wherein the speech recognition device is arranged for off-line speech recognition and for recognizing text information to be assigned to the transferred speech information, and wherein a quality of the recognized text information depends on a quality of the received speech information;

speech quality test means for continuously testing whether a quality of the speech information received during the recording mode is sufficient for obtaining a predefined quality of the recognized text information in response to the speech recognition device processing the speech information transferred by the transfer means in the transfer mode, the speech quality test means continuously determining (i) a signal-to-noise ratio of the received speech signal, (ii) a signal level of the received speech signal, and (iii) a speech velocity of words in the received speech signal during the recording mode; and feedback means responsive to quality information of the speech quality test means during the recording mode for transferring feedback information immediately during the recording mode, wherein responsive to one of determining a signal-to-noise ratio below a signal-to-noise threshold amount, determining a signal level below a signal level threshold amount, and determining a speech velocity above a speech velocity threshold amount, the speech quality test means provides quality information to the feedback means, further wherein the feedback information represents an immediate quality result of the quality test of the speech quality test means and provides an immediate indication how the quality of the received speech information can be improved.

* * * * *